United States Patent [19]

Bradford et al.

[11] Patent Number: 4,985,540

[45] Date of Patent: Jan. 15, 1991

[54] PROCESS FOR REMOVING RHODIUM-CONTAINING CATALYST RESIDUE FROM HYDROGENATED NITRILE RUBBER

[75] Inventors: William G. Bradford, Sarnia; Gilles J. Arsenault, Courtright; Alexander J. Marshall, Bright's Grove, all of Canada

[73] Assignee: Polysar Limited, Sarnia, Canada

[21] Appl. No.: 438,037

[22] Filed: Nov. 20, 1989

[51] Int. Cl.$^5$ .............................................. C08F 6/08
[52] U.S. Cl. ...................................... 528/482; 521/32; 521/33; 525/329.3; 210/688
[58] Field of Search ............... 528/482; 525/339, 329.3; 521/28, 32, 33; 423/22; 210/688

[56] References Cited

U.S. PATENT DOCUMENTS

| | | | |
|---|---|---|---|
| 3,700,637 | 10/1972 | Finch, Jr. | 525/339 X |
| 3,755,393 | 8/1973 | Kniese et al. | 521/32 X |
| 3,994,719 | 11/1976 | Corte et al. | 521/32 X |
| 4,396,761 | 8/1983 | Willis et al. | 528/487 |
| 4,464,515 | 8/1984 | Rempel et al. | 525/338 |
| 4,510,293 | 4/1985 | Kubo et al. | 525/338 |
| 4,595,749 | 6/1986 | Hoxmeier | 528/483 |

FOREIGN PATENT DOCUMENTS 1558491  1/1980  United Kingdom ............... 525/339

OTHER PUBLICATIONS

Chemical Abstracts 75:10878e (1971).
U.S. patent appl'n. Ser. No. 07/226,883, filed Aug. 1988.

*Primary Examiner*—Fred Teskin
*Attorney, Agent, or Firm*—Stevens, Davis, Miller & Mosher

[57] ABSTRACT

A process is provided for removing rhodium-containing catalyst residue from a solution of hydrogenated nitrile rubber. The process utilizes an ion exchange resin which must be both macroreticular and modified with a selected amine, thiol, carbodithioate, thiourea and/or dithiocarbamate functional group. The process is capable of removing rhodium from viscous rubber solutions containing less than 10 ppm rhodium. In a preferred embodiment, the process is undertaken in an ion-exchange column.

11 Claims, No Drawings

PROCESS FOR REMOVING RHODIUM-CONTAINING CATALYST RESIDUE FROM HYDROGENATED NITRILE RUBBER

FIELD OF THE INVENTION

This invention provides a process for removing rhodium catalyst residue from hydrogenated nitrile rubber.

BACKGROUND OF THE INVENTION

Polymer hydrogenation, and the subsequent separation of the hydrogenation catalyst from the polymer, are both well known unit operations, as referred to (for example) in U.S. Pat. Nos. 4,396,761; 4,510,293 and 4,595,749.

More specifically, certain rhodium-containing catalysts are known to be particularly suitable for the "selective" hydrogenation of nitrile rubber (i.e. the selective hydrogenation of the carbon-carbon double bonds without hydrogenation of the carbon-nitrogen triple bonds).

U.K. patent No. 1,558,491 teaches the use of chlororhodium (tris triphenylphosphine), $RhCl(PPh_3)_3$, in a process to hydrogenate unsaturated nitrile rubber. U.S. Pat. No. 4,464,515 teaches the use of hydrido rhodium tetrakis (triphenylphosphine) catalyst, $HRh(PPh_3)_4$, in a process to selectively hydrogenate unsaturated nitrile rubber. In both of these known processes, the unsaturated nitrile rubber is first dissolved in a suitable solvent to provide a viscous rubber solution. The catalyst is then dissolved in the rubber solution. These hydrogenation processes are said to be homogeneous because the substrate and catalyst are contained in the same phase.

The selectively hydrogenated nitrile rubber which is produced by either of the above homogeneous hydrogenation processes is less susceptible to heat-induced degradation in comparison to unsaturated nitrile rubber. One advantage of the above homogeneous processes is that they are efficient with respect to the minimal amount of catalyst which is required to catalyze hydrogenation of the carbon-carbon double bonds. Conversely, a disadvantage of a homogeneous catalytic process is that it is generally quite difficult to remove the catalyst from the system when the reaction is completed (in comparison to a heterogeneous process, where the catalyst is not dissolved and hence may be readily removed by filtration or centrifugation).

As rhodium is an active catalytic metal, it is desirable to remove it from the hydrogenated rubber to improve the quality of the final product. Furthermore, the high price of rhodium provides an economic incentive for the recovery of rhodium. There is very little prior art directed towards the recovery of rhodium from hydrogenated rubber. The exception is co-pending U.S. application Ser. No. 226,883 (filed August 1988), now U.S. Pat. No. 4,944,926, which teaches a method to treat rhodium-containing solutions derived from the hydrogenation of nitrile rubber. However, the method of the aforesaid application requires the use of a finely divided organic additive, which additive has the potential to contaminate the hydrogenated nitrile rubber product if it is not completely removed.

It is also known to recover rhodium complexes from non-viscous chemical process streams using ion exchange resins.

Chemical Abstracts ("CA") 75: 10878e (1971) describes the separation of rhodium-containing catalysts from oxo reaction streams using ion exchange resin.

CA 85: 588k (1976) teaches the use of a thiol-functionalized resin to recover Group VII metals from spent organic solutions which contain catalysts.

CA 87: 26590p (1977) describes a two stage process in which (i) an aqueous, noble-metal-containing solution is prepared by extracting metal from a catalyst carrier and (ii) the noble metal is adsorbed by ion exchange resin.

CA 95: 10502r (1981) relates to the recovery of Pt and Rh by extracting the metals from spent catalysts using HCl and $HNO_3$, followed by the subsequent use of an ion exchange column to separate the metals.

Heretobefore, there has not been disclosed the removal of rhodium from hydrogenated nitrile rubber solutions using a selected ion exchange resin. The present method does not require the use of a finely divided additive and provides excellent recovery efficiencies.

SUMMARY OF THE INVENTION

An improved process for removing rhodium-containing catalyst residue from hydrogenated nitrile rubber, consisting of contacting an ion exchange resin with a hydrocarbon phase, wherein said hydrocarbon phase contains (i) hydrogenated nitrile rubber
(ii) rhodium-containing catalyst residue, and
(iii) hydrocarbon solvent characterized in that said ion exchange resin is a macroreticular resin having a functional group selected from (a) a primary amine,
(b) a secondary amine
(c) thiol
(d) carbodithioate
(e) thiourea, and
(f) dithiocarbamate

DETAILED DESCRIPTION OF THE INVENTION

As used herein, the term "hydrogenated nitrile rubber" refers to the product which is obtained by the hydrogenation of at least 80% and preferably from 90–99.5 mole % of the original carbon-carbon double bonds contained in an unsaturated nitrile rubber. The unsaturated nitrile rubber is a copolymer of a $C_{3-5}$ $\alpha\beta$ unsaturated nitrile monomer and a $C_{4-6}$ conjugated diene monomer. A typical example is acrylonitrile-butadiene rubber, which is commonly referred to as NBR. Unsaturated nitrile rubber may be produced by the well known free radical emulsion polymerization process. A typical unsaturated nitrile rubber produced by the polymerization of acrylonitrile and butadiene contains from 20 to 50 weight percent bound acrylonitrile units, with the balance being bound butadiene.

Hydrogenated nitrile rubber is preferably prepared with a rhodium-containing catalyst, since many of the inexpensive base metal catalysts (such as Raney nickel, cobalt alkyls and aluminum alkyls) are either not sufficiently active to catalyze the hydrogenation of nitrile rubber and/or are not selective (i.e. they also catalyze the reduction of carbon-nitrogen triple bonds). The use of rhodium containing complexes as catalysts for the hydrogenation of nitrile rubber is described in U.S. Pat. No. 4,464,515 and U.K. patent No. 1,558,491, the disclosures of which are incorporated herein by reference.

The process of the present invention requires the use of a macroreticular resin having a selected functional group.

The term "macroreticular" is meant to convey its conventional meaning in ion-exchange terminology, namely a porous ion exchange resin having an average pore volume in excess of 0.7 ml/gram. Commercially available macroreticular resins may have a surface area of 100 m$^2$/g or higher. Such resins typically comprise crosslinked copolymers, especially styrene-divinylbenzene copolymers.

It is necessary for the ion-exchange resin to be macroreticular, but this condition is not itself sufficient. Suitable ion exchange resins are further characterized by having a functional group selected from:

(a) a primary amine
(c) thiol
(d) carbodithioate
(e) thiourea, and
(f) dithiocarbamate Preferred resins are further characterized by having a porosity (as measured by mercury porismetry) of greater than 45 percent and a mean pore diameter of greater than 250 Angstrom units. The preferred resins are also characterized by having a particle size distribution between 0.2 and 2.5 mm dry basis and a bulk density of between 600 and 900 g/l (wet basis).

Ion exchange resins having functional groups are well known and are commercially available. However, many of the commercially available, functionalized resins are not macroreticular and hence are not suitable for use in the present invention. Accordingly, descriptions of various techniques to provide ion exchange resins having functional groups are given in the accompanying examples.

In a preferred embodiment of the present invention, a suitable ion exchange resin is assembled in a bed configuration, especially by packing the resin in a "column" (i.e. a cylindrical container for the particles of ion exchange resin). More specifically, ion exchange resin having an average particle diameter between 0.2 and 2.5 mm and a wet bulk density between 600 and 900 g/l is preferably retained in the column bed by a fine mesh screen, while a solution of rhodium-containing hydrogenated nitrile rubber is passed through the column.

The rubber solution may contain from 0.5 to 20 weight/weight percent rubber (preferably from 3 to 9 percent) and hence is viscous. It has surprisingly been discovered that viscous rubber solutions containing less than 10 ppm of rhodium weight Rh/weight solution basis) may successfully be treated using an ion exchange resin column (i.e. packed with an appropriate resin), particularly when the temperature is between 60° C. and 140° C. Temperatures lower than 60° C. may be used, but do result in a decreased process efficiency. Temperatures higher than 160° C. should not be used because of the potential for partial decomposition of the ion exchange resin. Highly preferred operating temperatures are from 90 to 120° C.

As will be appreciated by those skilled in the art, a substantial pressure drop is caused by the flow of solution through a bed of small particles. This phenomenon is particularly pronounced when the solution is viscous and the particles are very fine. In a highly preferred embodiment of the present invention, the pressure drop resulting from the flow of the rhodium-containing hydrogenated nitrile rubber solution through the ion exchange resin bed is between 0.5 to 30 pounds per square inch gauge (psig) per foot of bed depth, and the total pressure drop is from 10 psig to 180 psig. Further details of the invention are provided by the following non-limiting examples.

EXAMPLE 1

This example illustrates the preparation of an amine functionalized, macroreticular resin and the use of the resin.

The macroreticular resin was a crosslinked divinylbenzene-styrene copolymer, reported to have a surface area of 800 m$^2$/g sold under the tradename Bio Beads SM16 by Bio Rad Laboratories (unless otherwise stated, the base resin used in this and the following examples was "processed" grade, i.e. washed and sieved by the resin supplier). The received resin was dried under reduced pressure at 60° C. prior to use.

The resins employed in inventive experiment 10 and 11 were initially chloromethylated as follows. 31 g of the resin, 100 ml of methylene chloride and 50 g of chloromethyl ethyl ether were initially placed in a stirred, 500 ml capacity, three necked flask. The reaction mixture was then cooled to between 0 and 5° C., followed by the slow addition of 325 ml of anhydrous stannic chloride. After stirring at room temperature for 24 hours, the resin was collected by filtration, washed with tetrahydrofuran ("THF")/water (1/1 volume ratio): THF/water plus HCl (1/1 volume ratio containing 10% concentrated HCl), water, THF, methanol and methylene chloride. The resin was further washed in a Soxhlet extractor for 12-14 hours using methylene chloride as the solvent. After drying under vacuum at 60° C., a greyish colour resin (39 g) was obtained.

For experiment 10, a resin having primary amine functionality ($-CH_2NH_2$) was prepared by reacting potassium phthalimide with the chloromethylated resin described above. The resulting phthalimidomethyl resin was treated with hydrazine hydrate to give the primary amine group.

For experiment 11, a resin having secondary amine functionality ($-CH_2-(NHCH_2CH_2)_n-NHCH_2CH_2Cl$) was prepared by reacting 2-methyl-2 oxazoline and potassium iodide with the chloromethylated resin. The resulting resin was isolated, then treated with aqueous NaOH to give the functional group.

The ability of the amine functionalized resins to remove rhodium from a solution of hydrogenated nitrile rubber was then tested according to the procedure described below.

Monochlorobenzene solutions of hydrogenated nitrile rubber containing between 8 and 14% rubber (weight/weight basis) were prepared by hydrogenating an acrylonitrile-butadiene rubber in the presence of a rhodium-containing catalyst and a triphenylphosphine co-catalyst, according to the process of U.S. Pat. No. 4,464,515.

A "standard" rubber solution containing 6% hydrogenated nitrile rubber was then prepared by dilution with monochlorobenzene. (The term "standard rubber solution", as used in this and the following examples, refers to this solution).

150 ml of the standard rubber solution was added to a stirred, 500 ml three necked flask, together with 0.5 g of the resin indicated in Table 1. This reaction mixture was stirred and refluxed under nitrogen for 5 hours. The resin was then removed from the mixture by filtration. The rubber was then recovered by evaporation of the solvent in a rotary evaporator, followed by drying in a reduced pressure oven at 60° C. Samples of the recovered rubber were analyzed for Rh content by atomic absorption spectroscopy, and results are shown in Table 1.

In comparative experiment 12, the rubber from an untreated, 150 ml sample of the standard rubber solution was recovered by the evaporation/drying procedures described above. The rubber from the control experiment was analyzed by atomic absorption spectroscopy and found to contain 104 ppm.

The Rh content of the rubber recovered in experiments 10 and 11 was 27 ppm respectively, which indicates that 74% of the Rh was removed (i.e. in comparison to the Rh content of the rubber of comparative experiment 3). Triphenylphosphine analysis of the rubber recovered in experiments 10 and 11 was 0.71 and 1.31 weight percent, respectively, which illustrates that these ion exchange resins are surprisingly effective in the present of free triphenylphosphine.

TABLE 1

| Experiment | Resin Functional Group | [Rh] of recovered rubber (ppm) | % Rh removal |
|---|---|---|---|
| 10 | —CH$_2$NH$_2$ | 27 | 74 |
| 11 | —CH$_2$—(NHCH$_2$CH$_2$)$_n$—NHCH$_2$CH$_2$Cl | 27 | 74 |
| 12-C | none used | 104 | — |

—C: comparative

EXAMPLE 2 (COMPARATIVE)

This is a comparative example in which a non-functionalized, macroreticular resin was used in an attempt to remove Rh from a Rh-containing monochlorobenzene solution of hydrogenated nitrile rubber.

Apart from the exceptions noted below, the conditions used in this example were the same as those of example 1:
(i) 2 grams of the non-functionalized macroreticular resin were used (instead of the 0.5 grams of functionalized resin used in experiments 10 and 11 of example 1).
(ii) the rubber solution used in this example had a marginally lower rhodium concentration (89 ppm, instead of the 104 ppm Rh noted in example 1).

The rubber recovered from the experiment of this example was found to contain 79 ppm of rhodium, indicating that only 11% of the rhodium was removed.

EXAMPLE 3

A macroreticular resin having carbodithioate functionality was prepared by bromination, lithiation and reaction with carbon disulfide, as described below.

The initial bromination reaction was completed in a three necked, 1 liter flask equipped with a reflux condensor, mechanical stirrer and dropping funnel. 20 grams of the macroreticular resin described in example 1 were added to the flask, together with 300 ml of methylene chloride and 0.5 g of ferric chloride. The mixture was stirred in darkness for 30 minutes, followed by the drop-wise addition of 30.3 grams of bromine (dissolved in 55 ml of methylene chloride).

After stirring for a further hour in darkness, the mixture was heated to reflux for 4.5 hours and then stirred at room temperature overnight. The reaction mixture still had a red colour due to excess free bromine. Aqueous sodium bisulfite (5%, 100 ml) was carefully added to the solution with stirring. The resin was collected by filtration, washed with methylene chloride, acetone, acetone-water (2:1), acetone, benzene and methanol, and then washed in a Soxhlet extractor overnight using methylene chloride as a solvent. After drying under vacuum at 60° C., 28.6 g of pale beige resin was obtained.

Analysis of the brominated resin showed it to contain 30.5 weight % Br.

Lithiation of the brominated resin was then completed as follows: A mixture of 8.0 g of the above brominated resin and 100 ml of dry THF was put in a 500 ml three-necked flask fitted with a mechanical stirrer, a condenser and a rubber septum. The system was purged with nitrogen and maintained under nitrogen throughout the reaction. The mixture was cooled to 0° C. and n-Butyl lithium in hexane (2.5 M in hexane, 30 ml) was added dropwise via a syringe. The reaction mixture was stirred at 0° C. for 30 minutes and then at room temperature for 1 hour. This lithiated resin was used for the next step without isolation.

A resin having lithium carbodithioate (—CS$_2^-$Li$^{30}$) functionality was then prepared as follows.

A solution of cuprous bromide and lithium bromide in THF was added to the above lithiated resin while keeping the mixture at a temperature of 0° C. Carbon disulfide was then added to the mixture to provide the desired functionality.

The ability of the above carbodithioate functionalized resin to remove rhodium from a solution of hydrogenated nitrile rubber was then tested in experiment 41 according to the procedure described in example 1. The rhodium content of the rubber recovered in experiment 41 was determined to be 9.2 ppm, indicating that 91% of the rhodium was removed.

The above procedures (i.e preparation of the carbodithioate functionalized resin, and use of the resin to remove rhodium from the standard rubber solution) were then repeated. This "duplicate", carbodithioate functionalized resin was used in experiment 42. The rhodium content of the rubber recovered from experiment 42 was determined by atomic absorption spectroscopy to be 5.8 ppm, indicating that 94% of the rhodium was removed.

Finally, a carbodithioate functionalized resin was prepared with an "unprocessed" grade of resin as the starting resin (i.e., the base resin was obtained from the same supplier, namely Bio-Rad Laboratories, but was not pre-washed and screened by the supplier prior to shipment). The "unprocessed" resin was brominated, lithiated and reacted with carbon disulfide, using the procedures described above. The resulting carbodithioate remove rhodium from a solution similar to the standard hydrogenated rubber solution as described in example 1 (the difference being that the solution of experiment 43 contained only 87 ppm of rhodium). The rhodium content of the rubber recovered from experiment 43 was determined by atomic absorption spectroscopy to be 7.9 ppm (87% Rh removal).

EXAMPLE 4 (COMPARATIVE)

This is a comparative example in which a functionalized non-macroreticular resin was prepared and used in an attempt to remove Rh from an Rh-containing solution of hydrogenated nitrile rubber.

The starting resin was a non-macroreticular, polystyrene/divinylbenzene ion exchange resin sold under the name DOW-PSDVB by Dow Chemical Company. Lithium carbodithioate functionality was introduced onto the resin via the procedures described in example 3 (i.e. bromination, lithiation and treatment with carbon disulfide).

0.5 grams of the resulting functionalized, non-macroreticular resin was used to treat a solution of hydrogenated nitrile rubber ([Rh]of rubber = 61 ppm) according to the procedure described in example 1. The rubber recovered from the experiment of this example contained 57 ppm of Rh, indicating that less than 7% of the Rh was removed by the resin.

EXAMPLE 5

This example illustrates the preparation and use of additional macroreticular resins having sulfur-containing functionality.

The primary amine-functionalized resin (i.e. having —$CH_2NH_2$ functionality) which was employed in example 1, experiment 10 was used as the starting resin for the experiments 51 and 52 of this example.

In experiment 51, the above described primary amine-functionalized resin was reacted with an alkyl isothiocyanate to provide a thiourea-functionalized macroreticular resin.

In experiment 52, a carbamate functionalized resin was prepared by reacting carbon disulfide with the primary amine functionalized resin.

In experiment 53, a macroreticular resin having a thiol functional group was utilized.

The above resins were used to remove rhodium from a sample of the standard rubber solution of example 1, using the procedure described in example 1. Results are shown in table 3.

TABLE 3

| Experiment | Resin Functional Group | [Rh] of recovered rubber (ppm) | % Rh removal |
|---|---|---|---|
| 51 | —$CH_2NHCNHCH_2CH=CH_2$ with S above C (double bond) | 9.2 | 91 |
| 52 | —$CH_2NHCS_2Na^+$ | 7.0 | 93 |
| 53 | —SH | 51 | 51 |

EXAMPLE 6

This example illustrates the use of an ion exchange column in a preferred embodiment of the present invention.

The resin employed was the thiol functionalized macroreticular resin of experiment 53. By way of further characterization, this resin had a particle size distribution of 0.3–1.2 mm and a bulk density of about 800 g/l. Approximately 60 grams (dry weight) of the resin was packed into a column having a length of approximately 91 cm and an inside diameter of approximately 1.9 cm.

The adsorption experiment was conducted by continually passing a rhodium containing monochlorobenzene solution of hydrogenated nitrile rubber through the packed column (once through basis) for a period of 54 hours. [Note: several different hydrogenated rubber solutions were used in this example. The solutions were not carefully standardized. Accordingly, three different samples of untreated solution were analyzed at different times, as noted in table 4.]

The column was preheated to between 80 and 100° C. and the rubber solution was also preheated to between 50 and 70° C. The rubber solution generally contained between 5.6 and 6.4% hydrogenated nitrile rubber wt/wt basis) and was added to the column at a flow rate between 4 and 10 g/min. Samples 1–6 were analyzed to determine the rhodium concentration of the rubber exiting the column. Samples C2, C4 and C6 were analyzed to determine the rhodium concentration of the rubber solution prior to treatment in the column and these comparative samples were withdrawn just prior to samples 2, 4 and 6 respectively. Rhodium analysis was completed according to the procedure described in example 1.

Data are shown in Table 4

TABLE 4

| Sample | [Rh] (ppm) | Column Temp Inlet | (0° C.) Outlet |
|---|---|---|---|
| 1 | 4.7 | 62 | 89 |
| C2 | 66 | 67 | 95 |
| 2 | 24 | 68 | 84 |
| 3 | 8.2 | 62 | 88 |
| C4 | 76 | 67 | 88 |
| 4 | 14 | 53 | 85 |
| 5 | 7.5 | 56 | 84 |
| C6 | 93 | 56 | 86 |
| 6 | 9.0 | 59 | 86 |

Note: C2, C4, C6 are comparative

What is claimed is:

1. A process for removing rhodium-containing catalyst residue from hydrogenated nitrile rubber, said process consisting of contacting an ion exchange resin with a hydrocarbon phase, wherein said hydrocarbon phase, contains
   (i) hydrogenated nitrile rubber
   (ii) rhodium-containing catalyst residue, and
   (iii) hydrocarbon solvent, characterized in that said ion exchange resin is a functionalized macroreticular resin having a functional group selected from
      (a) a primary amine,
      (b) a secondary amine,
      (c) thiol,
      (d) carbodithioate,
      (e) thiourea, and
      (f) dithiocarbamate.

2. The process of claim 1 wherein said functionalized macroreticular resin has a porosity of greater than 45%, a particle size distribution of from 0.2 to 2.5 mm, and a surface area of greater than 100 m²/g.

3. The process of claim 2 wherein said functionalized macroreticular resin is prepared from a styrene-divinylbenzene copolymer resin.

4. The process of claim 3 when conducted at a temperature from 60° C. to 120° C.

5. The process of claim 1 wherein said functional group is primary amine.

6. The process of claim 1 wherein said functional group is thiol.

7. The process of claim 1 wherein said hydrogenated nitrile rubber is hydrogenated acrylonitrile-butadiene rubber having from 10 to 0.5 mole percent unsaturation.

8. The process of claim 1 when conducted in the presence of free triphenyl phosphine.

9. The process of claim 1 when conducted in an ion exchange column.

10. The process of claim 9 wherein said hydrogenated nitrile rubber is hydrogenated acrylonitrile-butadiene rubber having from 10 to 0.5 mole percent unsaturation.

11. The process of claim 10 wherein the pressure drop through said column is from 10 to 50 psig.

* * * * *